United States Patent [19]
Jabsen

[11] 3,892,027
[45] July 1, 1975

[54] INDUSTRIAL TECHNIQUE

[75] Inventor: Felix S. Jabsen, Lynchburgh, Va.

[73] Assignee: The Babcock & Wilcox Company, New York, N.Y.

[22] Filed: Dec. 14, 1973

[21] Appl. No.: 425,033

Related U.S. Application Data

[62] Division of Ser. No. 193,383, Oct. 28, 1971, Pat. No. 3,795,040.

[52] U.S. Cl. .................. 29/200 P; 29/235; 29/241; 29/400 N; 29/433; 176/78
[51] Int. Cl.. B23p 19/00; B23p 19/04; G21c 21/00
[58] Field of Search .......... 29/200 P, 200 J, 400 N, 29/428, 433, 235, 241; 176/78

[56] References Cited
UNITED STATES PATENTS

| | | | |
|---|---|---|---|
| 3,665,586 | 5/1972 | Jabsen | 29/428 |
| 3,795,040 | 3/1974 | Jabsen | 29/433 |

Primary Examiner—Thomas H. Eager
Attorney, Agent, or Firm—J. M. Maguire, Esq.; J. P. Sinnott, Esq.

[57] ABSTRACT

An illustrative embodiment of the invention provides a fuel element assembly technique that facilitates the insertion of a fuel rod into a cell which is formed by a resilient grid structure. Initially, a cam is introduced into the cell. The inserted cam is rotated to deflect the grid surfaces that comprise the cell walls. This deflection prevents a leaf-spring mounted detent formed in the grid surface from extending into the path of the fuel rod. A key with a dimension that generally matches the deflected grid is inserted into the cell in order to engage the temporarily bowed grid surface. The inserted cam is rotated back to the initial orientation relative to the cell configuration and is withdrawn from the grid structure. The deflecting key lodged against the bowed grid surface, however, sustains the deflection in order to enable the fuel rod to be inserted into the cell without being abraded by the detent. After fuel rod insertion, the matching dimension portion of the deflecting key is disengaged from the grid surface and the key is withdrawn from the cell to release the leaf spring and allow the detent to clutch the fuel rod.

8 Claims, 5 Drawing Figures

INDUSTRIAL TECHNIQUE

This is a division of application Ser. No. 193,383, filed Oct. 28, 1971, now U.S. Pat. No. 3,795,040.

CROSS REFERENCES TO RELATED APPLICATIONS

Copending U.S. Patent Application Ser. No. 774,148, filed on Nov. 7, 1968 by Felix S. Jabsen for "Nuclear Fuel Rod Supporting Arrangements", now U.S. Pat. No. 3,665,586 and a division of this application, U.S. Application Ser. No. 105,388, filed Jan. 11, 1971 by Felix S. Jabsen for "Nuclear Fuel Rod Supporting Arrangement", both assigned to the assignee of the instant invention.

BACKGROUND OF THE INVENTION

1. Field of the Invention

This invention relates to methods and apparatus for assembling nuclear reactor fuel elements, and more particularly to a cam and key system for flexing a fuel element grid structure in order to facilitate fuel rod insertion, and the like.

2. Description of the Prior Art

The concentration of fissionable material required for the operation of a nuclear reactor ordinarily is achieved through an array of fuel rods. These rods usually contain a uranium compound in pellet form.

The structural integrity of these rods, however, presents a number of very difficult technical problems. For example, the nuclear reactions that occur within a reactor generate potentially dangerous quantities of radioactive matter. Some fissionable materials, moreover, are highly toxic. Consequently, if one or more of these rods should rupture and the within substances escape, a serious health hazard and a time-consuming and expensive decontamination and repair task will almost certainly result. The reactor environment makes the design of a sound fuel rod difficult because it imposes, for example, high temperature, coolant flow rate and pressure conditions as well as an intense radiation background. Accordingly, great care is exercised in the design, manufacture, and assembly of these fuel rods.

Fuel rods usually are assembled in clusters, or "fuel elements" for installation as a part of a nuclear reactor core. Some fuel element designs engage the individual rods in a regular physical arrangement by means of grids. Typically, these grids are formed from a group of interlocking plates that establish a cellular structure, each cell having lodged therein a portion of a fuel rod. Leaf springs, formed in the plate surfaces are provided with detents that protrude into the individual cells in order to contact and restrain the associated fuel rod.

The spring mounted detents present a manufacturing difficulty. If the detents and associated leaf springs exert an adequate restraining force, these same detents necessarily must abrade the fuel rod as it is inserted into and passed through the cell in question. Fuel rod damage of this sort tends to hasten deterioration and reduce useful fuel element life inasmuch, for example, as the scratches become corrison loci.

There is a need to enable a grid structure of the foregoing sort to engage the rods in a fuel element with sufficient force to prevent relative movement between rod and grid without damaging the individual rods during fuel element assembly.

SUMMARY OF THE INVENTION

To a large extent, the invention alleviates the problem of fuel rod scoring during fuel element assembly. A cam, for example, is inserted in a longitudinal direction into one of the cells that is formed by the interlocking grid plates.

Viewed in a plane that is transverse to this longitudinal direction, the cam preferably is square with rounded corners in general cross section. The transverse dimensions of the cam, moreover, are about the same size or slightly smaller than the projection onto a transverse plane of a square that is defined by the limits of the detents that protrude into the cell from the grid plates. Rotating the cam about the longitudinal axis cause the corners of the rounded cam to engage and press against the inwardly portruding detents. The force applied to these detents by the rotated cam urges the detents in a direction that is outward from the center of the cell.

A key is inserted into the cell. One side of this key has a protrusion that matches the depth of the grid deflection in order to engage the deflected grid surface and temporarily sustain the deformation.

Preferably, a second key is inserted into the cell in a similar manner and in a direction that is perpendicular to the direction in which the first key is inserted. A similar protrusion on the second key engages with the adjacent deflected grid surface to maintain this deflection. With both keys lodged in the cell, the cam is rotated back to the initial orientation with the transverse cross section of the cam generally aligned with the sides of the grid that form the cell. After the second rotation, the cam is withdrawn from the cell. The keys, however, continue to sustain the deflection in two of the grid plates that form sides of the cell. This sustained deflection establishes a sufficient clearance to enable a fuel element to pass longitudinally through the cell without being abraded or scored by the inwardly protruding detents.

After the fuel rod is positioned within the cell, the keys each are rotated to disengage the respective protrusions from the deflected grid surfaces. The stresses that caused the grid deflections in this way are relieved and force the associated detents inwardly toward the center of the cell. These detents bear against adjacent portions of the fuel rod surface in order to clutch the rod between all of the cell's inwardly protruding detents.

The rotated keys are withdrawn from the cell in a transverse direction to leave the fuel rod securely lodged within the grid structure.

More specifically, a typical grid structure may have in excess of 200 cells formed by an array of grid plates that interlock at right angles with each other. A spring depressing mechanism is provided to carry a matching number of spring retractors, or cams. These cams are inserted as a group into the corresponding cells in the grid structure. Because the cams all are attached to the spring depressing mechanism support plate through an array of cranks, or lever rod assemblies, an actuating plate which gangs all of the cranks together for simultaneous movement imparts the necessary degree of rotation to these cams.

The actuating plate, moreover, is driven by means of a hydraulic system. Typically, this system establishes a fluid pressure that is applied selectively through a valve to one of two oppositely driven pistons, depending on the desired direction of cam rotation. The piston movements are coupled to the actuating plate through a conventional piston rod and crank arrangement.

In operation, the hydraulic system is activated to drive the cams through an angular rotation of about 45°. This movement enables the rounded edges of the cams to engage the inwardly protruding leaf-spring mounted detents and deflect these detents outwardly, away from the centers of the respective cells. After the leaf springs have been deflected by the cams, the keys are inserted into the cellular structure. Preferably, each of these keys comprises a thin rod of generally rectangular bar stock. The protrusions, one for each of the cells penetrated by the key, are formed by the extent of the longest side of the rectangle. To provide an adequate clearance for the fuel rod insertion, however, some of the metal is removed from one side of the key. The keys are inserted into the grid structure in a transverse direction through apertures formed at the perpendicular intersections of the grid plates. Thus, for example, there is one key for each plate that forms the grid structure, each of these keys being generally parallel to and laying against a respective plate. At this stage in fuel element assembly, portions of two keys are lodged in each cell. The long side of the two keys in this instance being in engagement with the respective deflected cell surfaces. These key portions cross each other at a right angle in the common intersection that is formed by two of the grid plate surfaces.

After all of the keys have been positioned within the grid structure, the hydraulic system is manipulated to drive the cam actuating plate in the opposite direction. This actuating plate movement restores the cams to their original orientations relative to the transverse cross sections of the respective cells. The grid structure, with the inserted keys now sustaining the deformation, is withdrawn from the array of cams by movement in a longitudinal direction.

It has been found preferable, when subjecting the grid structure to the operation of the cams, to restrain the perimeter of the grid by means of a production fixture or clamp. This restraint prevents the grid from bending or deflecting in some undesired direction in response to the forces applied by the cams.

While the keys sustain the deflection, the fuel rods are carefully inserted into the individual cells to achieve the specific structural relations between the rods and the grid. The detents, deflected out of the path of the fuel rods as they are being inserted in respective cells, are effectively restrained from scoring or abrading the rod surfaces.

When the fuel rods are lodged in place, the keys are rotated to disengage the protrusions from the deflected detents. This disengagement releases the detents and enables them to bear inwardly toward the center of the respective cells and engage the adjacent fuel rod surfaces.

The rotated keys are withdrawn from the grid structure as hereinbefore described to provide a fully assembled portion of a fuel element.

Thus there is provided in accordance with the invention an improved technique for assembling fuel elements that reduces the risk of scoring or otherwise damaging the fuel rods during insertion into the grids. This system, moreover, eases and simplifies fuel element assembly procedures, thereby reducing costs and increasing production efficiency.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

DESCRIPTION OF THE PREFERRED EMBODIMENTS

Figure 1:
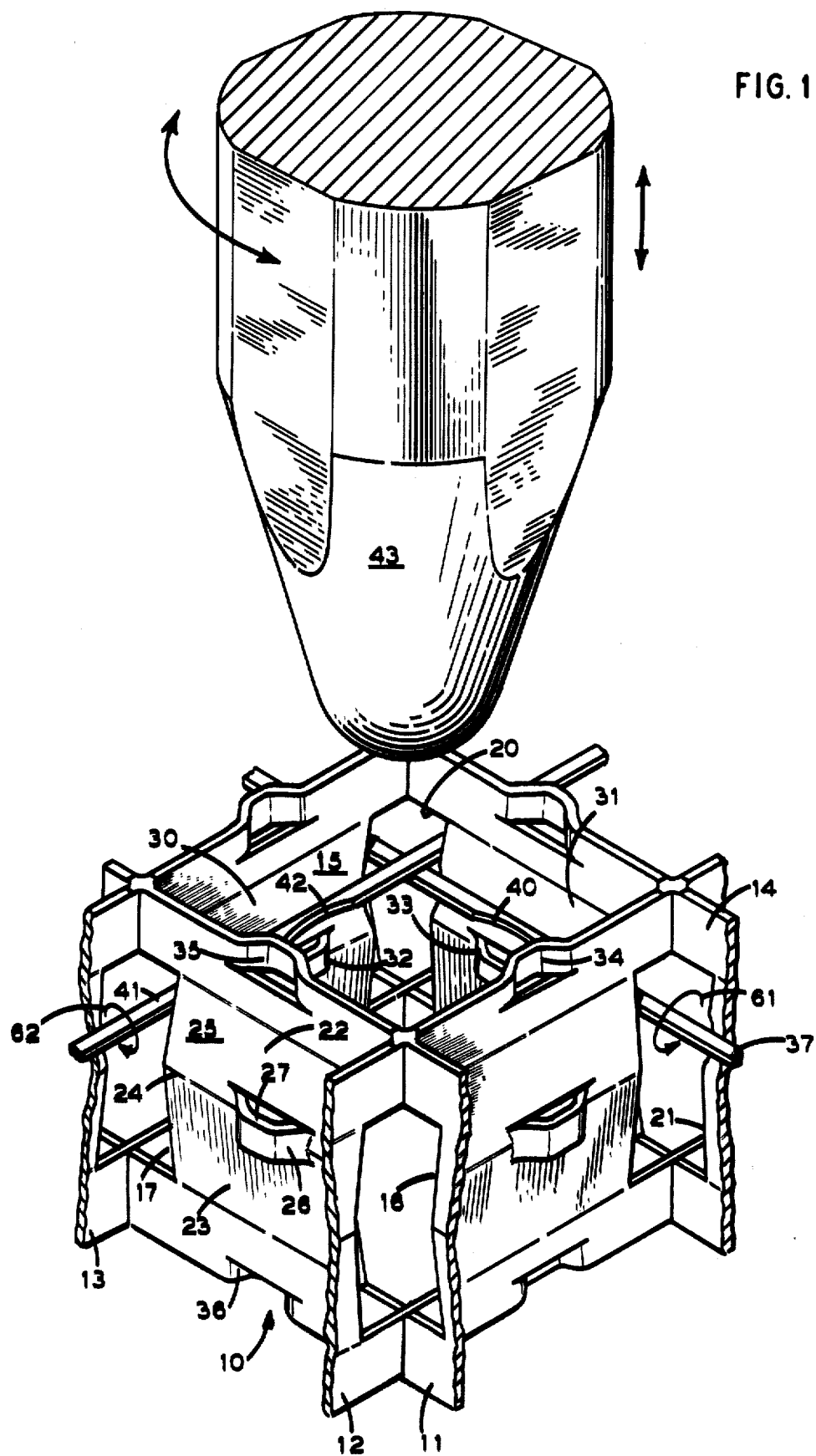
FIG. 1 is a prespective view of a portion of a grid structure showing a cam and key arrangement that illustrates features of the invention.

For a more complete appreciation of the invention, attention is invited to FIG. 1 which shows a portion of a typical grid structure 10 that is formed by means of an array of perpendicularly intersecting and interlocking grid plates 11, 12, 13, and 14. The surface of these plates, when joined, establish a group of cells of which only cell 15 is completely shown in FIG. 1.

The grid plates 11, 12, 13, and 14 are joined at respective intersections by means of spot welds (not shown). Cut out portions 16, 17, 20, and 21, provided in the central portions of the respective plates coincide at the grid intersections. The surfaces of the grid plates that are bounded by the cut out portions, as for example, in the plate 11, are bent slightly to form a strip 22 and an adjoining strip 23 by forming a transverse crease 24 that extends from the mid-point of the longitudinal edge of the cut out portion 16 to the mid-point of the longitudinal edge of the cut out portion 17. The crease 24 and the adjacent strips 22 and 23 combine to produce a shallow vee that protrudes away from the center of the cell 15 and toward the center of an adjoining cell 25.

A protruding detent 26 is formed athwart the crease 24 at the approximate middle of the crease between the cut out portions 16 and 17. The illustrative detent 26 is characterized by an inwardly jutting longitudinal crest 27 that is generally perpendicular to the transverse orientation of the crease 24. This physical combination of the strips 22 and 23, joined in a shallow vee at the crease 24 forms a leaf spring that resiliently supports the detent 26 for movement in the transverse plane. In a similar manner the cell 15 has leaf springs 30 and 31 formed in the surfaces of the mutually intersecting perpendicular grid plates 13 and 14. The leaf springs 30 and 31 bear respective detents 32 and 33 that protrude in toward the center of the cell 15, also for resilient movement in the transverse plane.

The edge of the grid plate 12 also is provided with a detent 34. A detent 35, moreover, is formed in the corresponding edge of the intersecting grid plate 11. Although the detents 34 and 35 protrude inwardly toward the center of the cell 15, they are not mounted for resilient movement in the transverse direction. A detent 36 is formed in the plate 11 in longitudinal alignment with the detents 35 and 26, but on the edge of the plate that is opposite to that edge which bears the detent 35.

The grid plate 12 also has another detent, formed in the transverse edge that is in the same plane as the detent 36. The detent 36, moreover, does protrude inwardly toward the center of the cell 15.

In order to deflect the spring mounted detents 32 and 33 in a transverse direction away from the center of the cell 15, a key 37 is inserted into the cell through the cut out portions 20 and 21. Preferably, the key 37 is formed from a thin strip of bar stock that has a generally rectangular cross section. The maximum dimension of the key cross section, moreover, should not be greater than the depth to which the detents 34, 35 and 36 protrude into the cell 15. As shown in FIG. 1 of the drawing, the key 37 extends in a transverse direction through the cell 15 and is in engagement with the surface of the grid plate 14 that forms one side of the cell 15.

A recess 40 is formed on one side of the key 37. Typically, the recess 40 has the shape of a segment of a circle. This shape can be manufactured by grinding away portions of the stock from which the key is made. In any event, the extent of the recess 40 should be of a sufficient depth to provide an adequate clearance for a fuel rod (not shown) when it is inserted into the cell 15.

The key urges the leaf spring 31 away from the center of the cell 15 to sustain an outward deflection of the shallow leaf spring vee that was established initially in a manner to be described subsequently in more detail. This key 37, moreover, imparts a slightly bowed form to the grid plate 14 that forms one side of the cell 15.

A key 41, with a recess 42 further engages a portion of the surface of the leaf spring 30 in order to deflect the leaf spring 30 and the detent 32 formed thereon away from the center of the cell 15. In all respects, the key 41 that urges the leaf spring 30 away from the center of the cell 15 is similar to the key 37 and the leaf spring 31 described above. In the foregoing manner the keys press against the respective leaf springs 31 and 30 to sustain an initial deflection of these members away from the center of the cell 15, as described subsequently in more complete detail.

Figure 2:
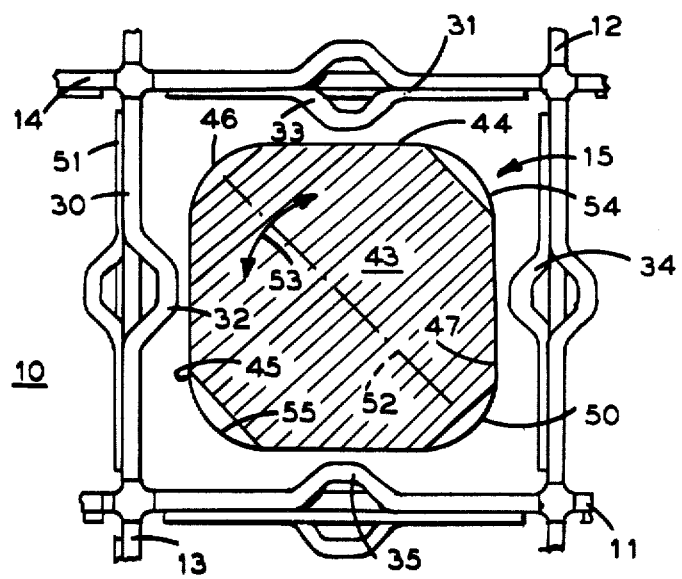
FIG. 2 is a plan view in full section of a cell and cam combination in accordance with the invention.

In accordance with an aspect of the invention, before the keys 37 and 41 are lodged in position within the cell 15, a spring retractor, or cam 43 is inserted into the cell to provide the initial deflections of the leaf springs 30 and 31. The cam 43, as shown in FIG. 2, comprises a length of hardened drill rod steel of a generally square transverse cross section. The rod has four flattened sides of which adjacent sides 44 and 45 are illustrative. The corners of the cam 43 are, however, provided with a round 46 on the corner that joins the adjacent flat sides 44 and 45.

The transverse distance between flat 45 and a parallel flat 47 is slightly less than the distance projected into a transverse plane that separates the crests of the detents 32 and 34 which protrude into the cell 15 when the leaf spring 30 that supports the detent 32 is not deflected.

In contrast, diagonal distance 52 between the round 46 and opposite round 50 is generally equal to the transverse distance between the opposing parallel surfaces of the grid plates 12 and 13, and exclusive of the depth to which the leaf spring 30 protrudes into the cell 15.

The spring retractor or cam 43 is inserted into and centered within the cell 15. To deflect, or to bow out the leaf springs 30 and 31 from the sides of the grids 13 and 14, the cam 43 is rotated in either a clockwise or in a counter clockwise direction as shown by a double headed arrow 53.

By continuing, for example, a clockwise rotation through an angle of about 45° as viewed in the plane of the drawing, the round 46 and a round 55 engage the crests of the leaf spring mounted detents 32 and 33. This engagement urges and deflects these detents away from the center of the cell 15. At the same time, recesses machined into the round 50 and a complementary round 54 on the cam 43 provide a passageway that facilitates the insertion and withdrawal of the keys that sustain the detent deflection.

The leaf springs 30 and 31 are deflected by the cam 43 (FIG. 3) away from the center of the cell 15 to force the crests of the springs to align generally with the respective surfaces of the grid plates 13 and 14 that form two sides of the cell 15. The clearance between these deflected sides and the recesses that are machined into the adjacent rounds on the cam 43 is sufficient to enable the associated keys 41 and 37 (FIG. 1) to be lodged in the cell 15.

Figure 3:
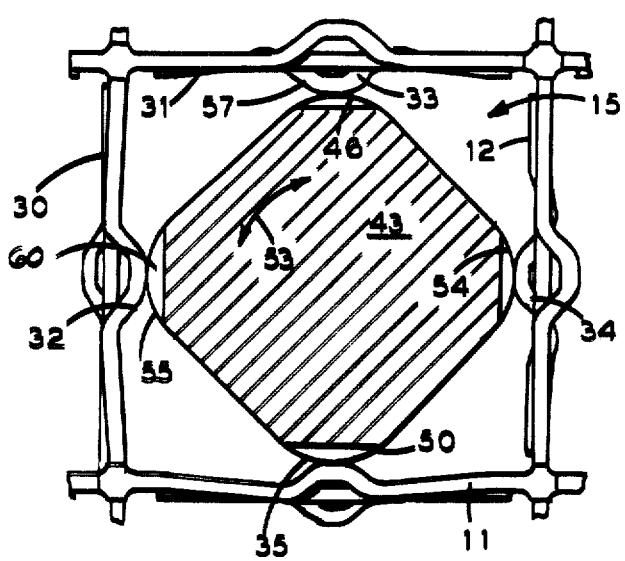
FIG. 3 is a plan view in full section of the cell and cam combination shown in FIG. 2, with a different orientation of the cam relative to the cell.

Thus, as shown in FIG. 3, this clearance is wide enough to enable the respective keys 37 and 41 to pass between gaps 57 and 60 established between the cam 43 and the temporarily deflected lead springs 30 and 31.

Turning once more to FIG. 1, the keys 37 and 41 press against the respective adjacent leaf springs and maintain this leaf spring deflection. Thus, the cam 43 is rotated in a direction opposite to that in which it originally was shifted to produce the preferred deflection. After rotation, the cam 43 assumes the orientation shown in FIG. 2 and disengages the rounds 46, 50, 54, and 55 from the surfaces that comprise the cell 15. The cam 43 is withdrawn from the cell 15 by moving it longitudinally, in a direction that is perpendicular to the plane of the FIG. 2 drawing. The cam 43 illustrated in FIG. 1 is withdrawn from the cell 15, and the keys 37 and 41 sustain the temporary outward deflections of the cell surfaces, or more specifically, the deflections of the leaf springs 30 and 31 in the grid plates 13 and 14 that form a part of the bounds of the cell 15.

This apparently small deflection, nevertheless, enables a fuel rod (not shown) to be inserted into the cell 15 without scraping against the detents that protrude into the center of the cell. The initial deflection by means of the cam 43, moreover, relieves the slender keys 37 and 41 of the burden of producing the leaf spring deformation. This preferred procedure reduces the incidence of broken and twisted keys that heretofore have, on occasion, marred attempts to produce the initial deflection by turning the keys to urge the key protrusions against the respective leaf springs.

Figure 4:
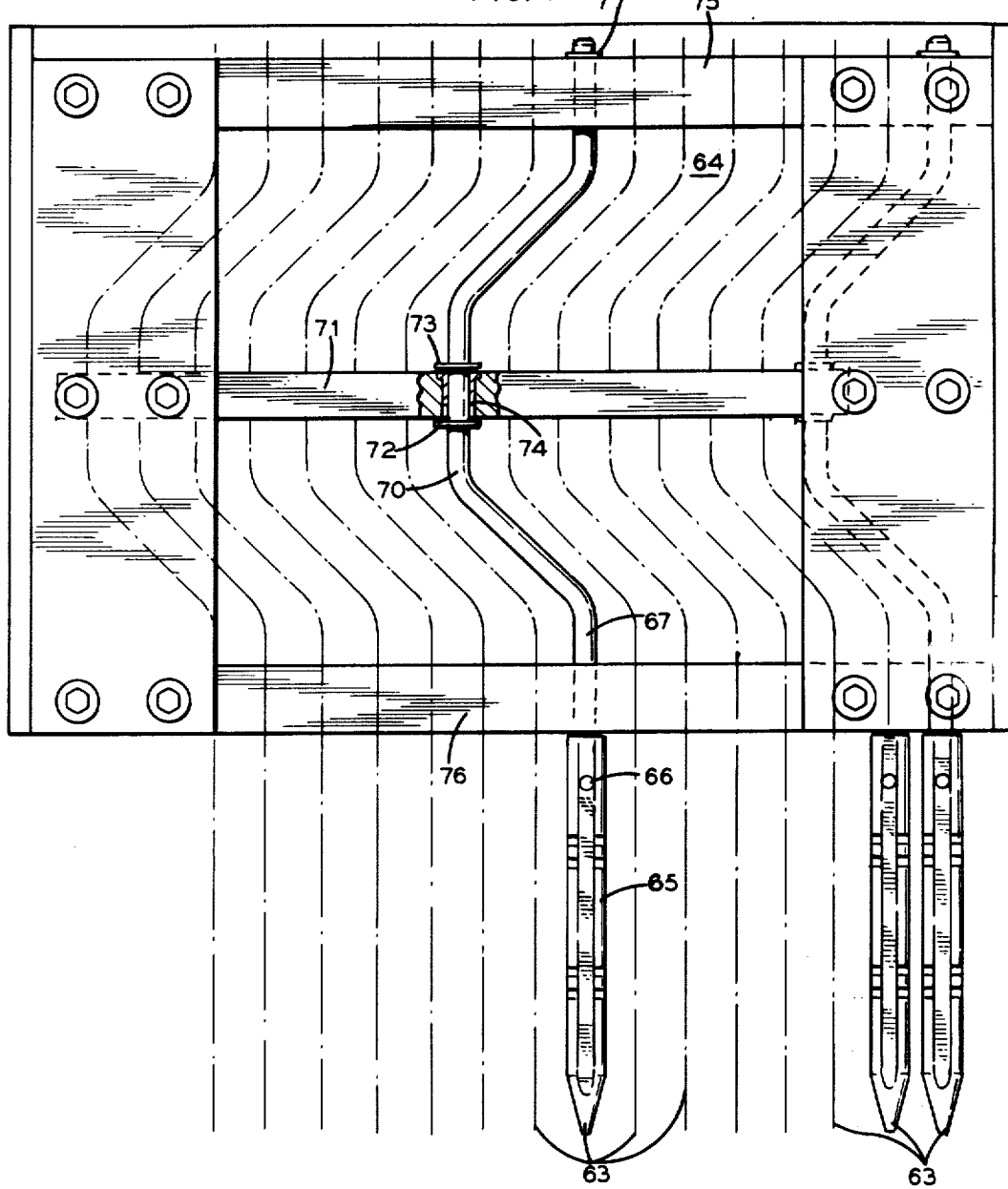
FIG. 4 is a side elevation in broken section of a typical spring depressing mechanism assembly for use in connection with the invention.

When the fuel rod is properly positioned within the grid structure 10, the keys 37 and 41 are rotated in the direction shown by arrows 61 and 62 in FIG. 1 to disengage the broad dimension of the keys cross section from the leaf spring surfaces of the grid plates 14 and 13, respectively. The elasticity inherent in the leaf springs 31 and 30 then causes these springs to shift in toward the center of the cell 15. In this condition, the spring mounted detents 32 and 33 are pressed against adjacent portions of the fuel rod surface, and in this way to firmly clutch the fuel rod with all of the detents that protrude into the cell 15. Although for the purpose of simplified description, the invention thus far has been disclosed with respect to one cell and one fuel rod. The usual industrial grid structure, however, may accommodate a group of several hundred fuel rods. Thus, in accordance with another feature of the invention, the cams are arranged in a ganged array to facilitate grid loading in a minimum number of operations. As shown in FIG. 4, for example, an array of 208 cams 63 depend from a spring depressing mechanism assembly 64.

An individual cam in the array 63, of which the cam 65 is typical, is connected to the assembly 64 through individual roll pins 66 that are transverse to the longitudinal cam axis. The roll pin 66 connects the cam 65 to an individual lever rod assembly 67. The end of the lever rod assembly 67 that protrudes from the spring depressing assembly is nested in telescopic engagement within a central bore (not shown) that is formed with the cam 65. The middle portion of the lever rod assembly 67 is characterized by a crank 70. An actuating plate 71 pivots the crank 70 to translate a reciprocating plate motion into a rotation of the cam 65 in the tranverse plane. All of the cams in the array 63 are similarly ganged to respond to the movement of the plate 71.

Illustrative of all of the cranks, the crank 70 has retaining rings 72 and 73 on opposite sides of an aperture 74 which is formed in the plate 71. The end of the lever rod assembly 67 which is opposite to the end that is coupled to the cam 65 is pivotally received in a support plate 75. A shank on the lever rod assembly adjacent to the cam 65, moreover, is pivotally mounted in another support plate 76. The end of the rod assembly 67 that is pivotally received in the plate 75 also is provided with a retaining ring 77.

To rotate the cam 43 through an angle of, for example, 45° as shown in FIGS. 2 and 3, the actuating plate 71 is shifted arcuately in the transverse plane. This movement drives the individual crank portions of the respective lever rod assemblies through circular arcs that subtend about 45°. The shank portions of these lever rod assemblies, as well as the cams connected thereto, consequently rotate through the same angle.

Figure 5:
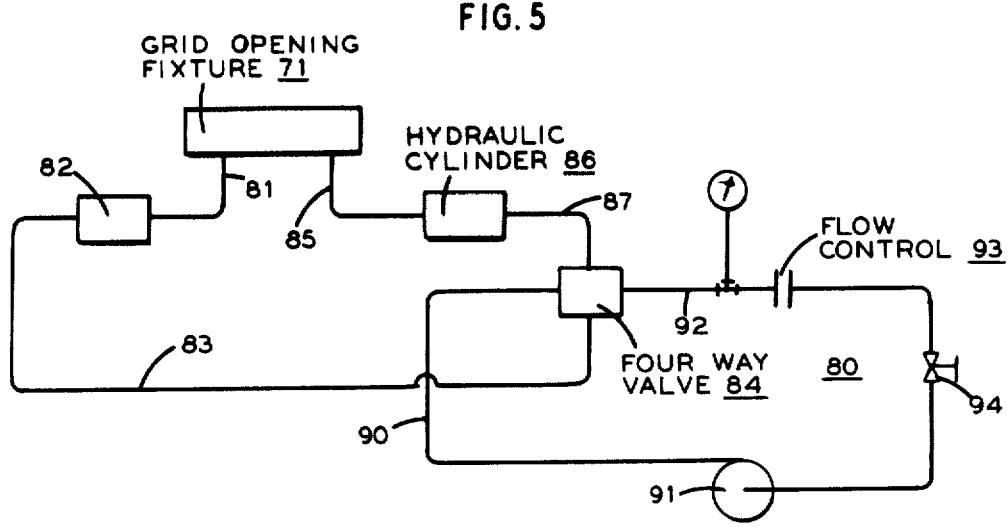
FIG. 5 is a schematic diagram of an hydraulic system for operating the spring depressing mechanism shown in FIG. 4.

FIG. 5 shows an hydraulic system 80 that provides the forces needed to shift the actuating plate 71 in two opposite directions through the appropriate distance. The actuating plate 71, for instance, is connected through a linkage and a piston rod 81 to a piston (not shown) in an hydraulic cylinder 82 in order to shift the plate into one of these two predetermined positions. The fluid pressure that drives the piston in the cylinder 82 is provided through a conduit 83, which is connected to an outlet in a four-way control valve 84. The movement imparted to the array of cams through this shift in the position of the plate 71 produces a shift in cam position that corresponds to a rotation from an orientation characterized by a general alignment with the sides of the cell 15 (FIG. 2) to an engagement between the rounds on the cams and the respective spring mounted detents (FIG. 3).

The return stroke, which rotates the array of cams back into the initial, aligned orientation relative to the sides of the individual cells, is provided through a piston rod and linkage 85 that is coupled to a piston (not shown) within an hydraulic cylinder 86. Fluid pressure for the cylinder 86 is applied through a conduit 87 from another of the outlets on the control valve 84. The hydraulic fluid is supplied to the valve 84 through a conduit 90 that connects the discharge outlet of a hydraulic pump 91 to an inlet on the control valve 84. The fluid return for the hydraulic system from the valve 84 to an inlet on the pump 91 is completed through a conduit 92. A throttle valve or flow control device 93 and a gate valve 94 also are coupled to the conduit 91 in order to regulate the hydraulic fluid in the system.

In operation, FIG. 2 shows the cam 43, which is one of the array of cams 63 (FIG. 4) that are inserted into the cells in the grid structure. To prevent the movement of the cams from warping or twisting the grid structure 10, a clamp (not shown), rigidly engages the grid periphery and locks the grid in position. The clamped grid is slipped over the array of cams 63 (FIG. 4), each cell in the grid structure receiving a respective cam. As hereinbefore mentioned, the flat surfaces of the cam are in general parallel alignment with the sides of the grid that form the cell boundaries.

The control valve 84 (FIG. 5) is manually operated to couple hydraulic pressure from the pump 91 through the conduits 90 and 83 to the hydraulic cylinder 82. The piston rod and linkage 81 respond to the application of this pressure by shifting the position of the actuating plate 71 and thus, the cranks that are ganged to this plate move through a circular arc of predetermined distance. As shown in FIGS. 2, 3, and 4, this motion is translated into a rotation in the transverse plane of the cams that are connected to the respective lever rod assemblies in the spring depressing mechanism 64. This rotation of the cams, through a uniform angle of about 45°, produce an initial outward deflection in the leaf springs that heretofore had protruded into the individual cells as the rounds on the cams engage and press against the adjacent detents on these springs.

Turning now to FIG. 1, the keys 37 and 41 are inserted through the cut out apertures 20, 21, and 17, 20 respectively that are formed at the cell corners. The broad dimension of the cross section of the keys 37 and 41 bear against the respective deflected leaf springs 31 and 30, the maximum transverse extent of this dimension being approximately equal to the depth of the leaf spring deflection. After lodging the keys 37 and 41 within the cell 15, the valve 84 (FIG. 5) is once more operated. In this condition, the valve 84 relieves the hydraulic pressure in the cylinder 82 and applies hydraulic pressure to the return cylinder 86 in order to force the piston rod and linkage 85 to drive the actuating plate 71 through the same circular arc, albeit in a direction opposite to that in which it was driven by the piston rod and linkage 81. This return stroke pivots the ganged cams back to the initial insertion orientation relative to the portions of the grid sides that form the individual cells in the grid structure. As shown in FIG. 1, the cam 43 is withdrawn in a longitudinal direction from the associated cell 15 to illustrate the manner in which all of the cams in the grid structure are removed from the spring depressing mechanism assembly. The keys 37 and 41 retain the respective leaf springs 31 and 30 in their outwardly bowed or deflected position. The fuel rods are inserted into the temporarily enlarged apertures that characterize the cells in the grid structure 10. The bowing imparted to the deflected leaf springs that form part of the sides of the individual cells provide a sufficient clearance to enable the fuel rods that are being inserted to avoid a scraping or gouging contact with the detents that obtrude into the cells in the grid structure.

After the fuel rods each are received within the individual cells, the keys 37 and 41 are manually rotated in the direction shown by the arrows 61 and 62 in FIG. 1 to shift the long cross section dimension of the keys away from the respective deflected leaf spring surfaces. Turning the broad dimension of the keys away from the leaf springs, relieves the stresses on the rods 37 and 41. Because the keys are being turned to a condition of lower stress, the possibility of twisting or breaking the keys during this step in the fuel element assembly is quite small. The rotated keys are withdrawn from the grid structure through the cutout apertures 20, 21, and 17, 20. Rotating the keys 37 and 41 in this manner also relieves the deflecting forces on the leaf springs 31 and 30. The inherent resiliency of these springs causes them to drive the respective detents against the outer surface of the fuel rod (not shown) and thereby clutch the rod between all of the detents that protrude inwardly toward the center of the cell 15.

A preferred embodiment of the invention does not require the leaf springs 30 and 31 (FIG. 1). For example, the detents that protrude in toward the centers of the respective cells can be formed in the flat surfaces of the individual grid plates. Cams, operated in the manner described above, urge or deflect the detents away from the centers of the respective cells. It has been found that the depths of the deflections that are provided by these cams are sufficient to enable the keys to be inserted into the cells. After the cams are withdrawn from the grid structure the deflections in the grid plates continue to be sustained by the keys. The fuel rods are positioned in the cells and the keys are then rotated to disengage from the surfaces of the plates. As these keys are being rotated, the inherent resiliency of the grid plates tends to urge the detents back in toward the centers of the respective cells. Thus impelled, the detents clutch the adjacent surfaces of the respective fuel rods in order to retain the rods in the predetermined positions within the grid structure.

Thus, there is provided in accordance with the invention an improved method and apparatus for assembling fuel elements that protects the fuel rods from scoring and abrasion during assembly.

I claim:

1. Fuel element asembly apparatus for use in a cellular grid structure with resiliently mounted detents that protrude toward centers of the respective cells comprising cam means for insertion in one direction into at least one of the cells, the surface of said cam means fitting generally within the confines of said cell, means for shifting the position of said cam sufrace to engage at least a portion of the grid structure to deflect the resiliently mounted detents away from the center of said cell, and key means for insertion into said cell in another direction, said key means having at least one dimension to engage the grid structure and sustain the resiliently mounted detent deflection.

2. An assembly apparatus according to claim 1 wherein said cam is inserted into said cell in a direction that is generally perpendicular to the direction of said key insertion.

3. An apparatus according to claim 2 wherein said means for shifting the position of said cam surface further comprises means for imparting a rotational movement to said cam means about an axis that is generally parallel to said cam insertion direction.

4. An apparatus according to claim 3 wherein said means for imparting a rotational movement further comprises a crank coupled to said cam means, and means for actuating said crank in order to impart said rotational movement to said cam means.

5. An apparatus according to claim 4 further comprising an hydraulic system for driving said actuating means.

6. An apparatus according to claim 1 wherein said key means further comprise a slender rod having a plurality of recesses formed therein, the depth of each said recesses providing respective clearances for the insertion of a fuel rod.

7. A spring retractor mechanism for use in assembling a fuel element with a cellular grid structure that has resiliently mounted detents protruding into the centers of each of the cells comprising a plurality of generally parallel cams for insertion in one direction each into a respective one of the cells, said individual cams having a shape in a plane that is generally transverse to said one direction that fits within said respective cell, and lever rod means coupled to said cams for selectively rotating said cams to engage and deflect the detents away from the centers of the cells.

8. A retractor mechanism according to claim 7 further comprising an hydraulic actuating system for selectively driving said lever rod means.

* * * * *